United States Patent
Hertel

[11] 3,743,204
[45] July 3, 1973

[54] CORE MICROFILM
[75] Inventor: Heinz E. Hertel, Mount Prospect, Ill.
[73] Assignee: Bell & Howell Company, Chicago, Ill.
[22] Filed: Nov. 1, 1971
[21] Appl. No.: 194,251

[52] U.S. Cl.................................. 242/68.5, 242/74
[51] Int. Cl..................... B65h 75/02, B65h 75/28
[58] Field of Search................... 242/68.5, 74, 192

[56] References Cited
UNITED STATES PATENTS
| | | | |
|---|---|---|---|
| 3,383,069 | 5/1968 | Riedel | 242/74 |
| 3,246,729 | 4/1966 | Bishop | 242/74 X |
| 3,275,253 | 9/1966 | Cherniavskyj | 242/192 |

Primary Examiner—George F. Mautz
Assistant Examiner—Edward J. McCarthy
Attorney—J. Robert Stapleton

[57] ABSTRACT

A film anchoring core for a rotatable film spool, cartridge, or the like, to anchor the core terminal portion of the film. The core has a W-shaped film end anchoring groove with the ends of the outer leg portions of the W-shaped groove opening through the perimeter of the core generally on opposite sides of the core to permit threading film onto the spool and locking the film to the core from either side thereof. The W-shaped groove has a third opening through the perimeter of the core at the juncture of the inner leg portions of the groove. The portions of the core between the outer and inner leg portions of the W-shaped groove define a pair of snubber posts about which a terminal loop of film engaged in the groove is adapted to be anchored to permit threading and locking of the film from either side of the spool. Portions of the core at the junctures of the inner and outer legs of the groove and at the juncture of the inner legs of the spool define snubber shoulders for the film.

11 Claims, 2 Drawing Figures

Inventor:
Heinz E. Hertel.

3,743,204

CORE MICROFILM

BACKGROUND AND SUMMARY OF THE INVENTION

This invention relates to an improvement in motion picture projectors, or the like, and more particularly relates to improved means for anchoring the core terminal portion of a reel of film to the core of a rotatable film spool.

The principal object, therefore, is to provide a new and improved means in a film supply cartridge, spool, or the like, for retaining the inner end of the film strip coupled to the rotary core of the cartridge, spool, or the like.

A further object of the invention is to provide a new and improved film anchoring means of the character described wherein the anchoring means is symmetrical with respect to the core to permit threading and anchoring the film onto the core from either side thereof.

More particularly, as shown in the U.S. Pat. to Cherniavskyj, No. 3,275,253, and assigned to the assignee of the present invention, a film anchoring means for the core terminal portion of a reel of film is afforded by a reverse bend snubber groove and pin arrangement whereby the film may be anchored to the core by threading the film onto the core from one side thereof. Junctures at diverging positions of the sinuous film anchoring groove or slot provide snubber shoulders for the film, and a terminal loop of the film engaged in the groove is adapted to be looped about an anchoring post. With such prior structures, the film may be threaded and locked to the core from only one side thereof, and the post and groove means is not adaptable for a symmetrical design which would permit threading and anchoring of the film from either side of the core (or spool). This invention is directed particularly to solving such problems.

The invention herein contemplates the utilization of a film end anchoring groove of sinuous shape including a plurality of divergingly extending portions, with snubber shoulders at junctures of the diverging portions, and with opposite ends of the groove opening through the perimeter of the core generally on opposite sides thereof to permit threading film onto the spool and anchoring the film to the core from either side thereof. The groove has a symmetrical shape on opposite sides of a plane passing generally through the axis of the core. The groove has divergently extending portions on opposite sides of the plane defining snubber shoulders at the junctures of the diverging groove portions, one snubber shoulder on each side of the plane.

In the preferred embodiment of the invention, the sinuous film end anchoring groove is W-shaped with outer and inner leg portions, the ends of the outer leg portions of the W-shaped groove terminating in openings through the perimeter of the core. The junctures between the outer and inner leg portions of the W-shaped groove define a pair of snubber shoulders. The juncture of the inner leg portions of the W-shaped groove define a third snubber shoulder, and the groove also has an opening at said juncture through the perimeter of the core whereby the portions of the core between the outer and inner leg portions define a pair of snubber posts about which a terminal loop of film engaged in the groove is adapted to be anchored to permit threading and anchoring the film from either side of the core.

Other objects, features and advantages of the invention will become apparent from the following detailed description taken in connection with the accompanying drawings.

DETAILED DESCRIPTION OF THE INVENTION

Figure 1:
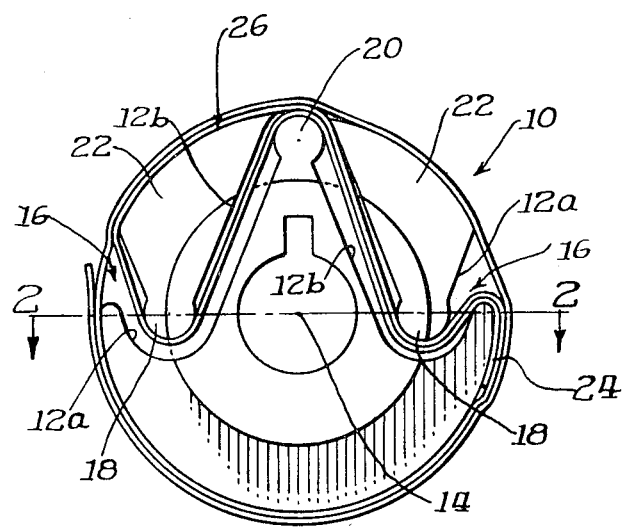
FIG. 1 is a side elevational view of a one piece core for a film supply cartridge, spool, or the like, embodying the concept of the present invention.
Figure 2:
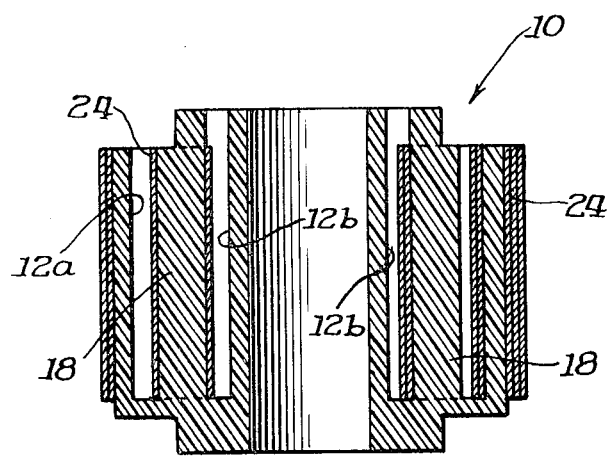
FIG. 2 is a central section taken generally along the line 2—2 of FIG. 1.

The invention is shown herein as embodied in a one piece rotary core, generally designated 10, for use with a film supply cartridge, spool, or the like (not shown in the drawings), for retaining the inner end of a film strip coupled to the rotary core of the cartridge. The improved means of anchoring the core terminal portion of film is afforded by a symmetrical film and anchoring groove of sinuous shape. To avoid confusion, the W-shaped groove is not assigned a numeral in the drawings. However, its shape is readily ascertainable from FIG. 1 and individual portions thereof are described with reference numerals in greater detail below.

More particularly, the W-shaped film and anchoring groove has outer leg portions 12a and inner leg portions 12b defining generally symmetrical, divergently extending groove portions on opposite sides of a plane passing through the axis 14 of the core. The outer leg portions 12a of the W-shaped film anchoring groove terminate in openings, generally designated 16, generally on opposite sides of the core to permit threading film onto the cartridge, spool, or the like, and anchoring the film to the core 10 from either side thereof.

Portions of the core at the junctures between the outer and inner leg portions 12a and 12b, respectively, of the W-shaped film anchoring groove define a pair of snubber shoulders 18. Similarly, a third snubber shoulder 20 is defined by the portion of the core at the juncture between the inner diverging leg portions 12b of the groove.

The W-shaped film anchoring groove is formed so as to include a third opening through the perimeter of the core at the juncture of the inner leg portions 12b of the groove, opposite the third snubber shoulder 20. In this manner, the portions of the core between the outer and inner leg portions of the groove define a pair of snubber posts 22 about which a terminal loop of film engaged in the W-shaped groove is adapted to be anchored to permit threading and anchoring of the film from either side of the core.

With such a structure as defined above, the threading path of the film is not critical because no special orientation of the core is required due to its symmetrical design and thus the film may be threaded onto and locked to the core from either side of the spool or cartridge with which the core is associated.

The drawings illustrate the terminal end 24 of a reel of film threaded into the right-hand opening 16 (as viewed in FIG. 1) and locked to the core. When the film is threaded into the right-hand opening of the W-shaped groove, the left-hand snubber post portion 22 of the core acts to anchor a terminal loop of film, generally designated 26. With symmetrical design of the film anchoring groove, should the film be threaded into the left-hand opening 16, the right-hand portion 22 of the core would comprise the snubber post for a similar terminal loop of film. With the threading arrangement of the film as shown in FIG. 1, the structure of the invention is such that the body of the film laps over and frictionally thrusts the terminal extremity portion of the film firmly against the right-hand snubber shoulder 18 to resist pulling out of the terminal portion upon axial tension in a direction tending to pull the film from the anchoring groove. In addition, the snubbing engagement of the film over the shoulder 20 relieves the terminal portion from the effects of pull-out force, and secure anchorage of the terminal loop 24 about the left-hand snubber post portion 22. It will be appreciated that the terminal loop anchorage of the film in the sinuous anchoring groove is such that there is actually increased snubber anchoring grip of the terminal loop portion of the film as pulling tension increases.

The above description of the threading of the film onto the core 10, and the various tensions and lapping of the film portions about the snubbing shoulders and snubbing post portions would be the same, but in a reverse direction, if the film was threaded onto the core through the left-hand opening 16 at the outer end of the left-hand outer leg 12a of the symmetrical W-shaped groove.

The foregoing detailed description has been given for clearness of understanding only, and no unnecessary limitations should be understood therefrom, as some modifications may be obvious to those skilled in the art.

I claim:

1. A film carrying core for a rotatable film spool, cartridge, or the like, said core having a film end anchoring groove of sinuous shape including a plurality of divergently extending intersecting portions forming junctures with snubber shoulders at said junctures and opposite sides thereof to permit threading film onto the spool and anchoring the film to the core from either side thereof.

2. The film carrying core of claim 1 wherein said groove has a symmetrical shape on opposite sides of a plane passing through the axis of the core.

3. The film carrying core of claim 2 wherein said groove has divergently extending portions on opposite sides of said plane defining snubber shoulders at the junctures of said portions, one snubber shoulder on each side of said plane.

4. The film carrying core of claim 1 wherein said groove is W-shaped with outer and inner leg portions, the ends of the outer leg portions of the W-shaped groove terminating in said groove openings through the perimeter of the core.

5. The film carrying core of claim 4 wherein said groove has a third opening through the perimeter of the core at the juncture of the inner leg portions of the W-shaped groove.

6. The film carrying core of claim 4 wherein portions of the core at the junctures between the outer and inner leg portions of said W-shaped groove define a pair of snubber shoulders.

7. The film carrying core of claim 6 wherein the juncture of the inner leg portions of said W-shaped groove define a third snubber shoulder.

8. The film carrying core of claim 7 wherein said groove has an opening through the perimeter of the core at the juncture of the inner leg portions of the W-shaped groove opposite said third snubber shoulder.

9. A film carrying core for a rotatable film spool, cartridge, or the like, said core having a W-shaped film end anchoring groove with outer and inner leg portions, the ends of the outer leg portions of the W-shaped groove opening through the perimeter of the core generally on opposite sides of the core to permit threading film onto the spool and anchoring the film to the core from either side thereof.

10. The film spool of claim 9 wherein said groove has a third opening through the perimeter of the core at the juncture of the inner leg portions of the W-shaped groove.

11. The film spool of claim 10 wherein the portions of said core between the outer and inner leg portions define a pair of snubber posts about which a terminal loop of film engaged in said groove is adapted to be anchored to permit threading and anchoring of the film from either sides of the core.

* * * * *